US012422586B2

(12) United States Patent
Tkabladze

(10) Patent No.: US 12,422,586 B2
(45) Date of Patent: Sep. 23, 2025

(54) COMPENSATED NEUTRON GAMMA DENSITY

(71) Applicant: Schlumberger Technology Corporation, Sugar Land, TX (US)

(72) Inventor: Avtandil Tkabladze, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 186 days.

(21) Appl. No.: 18/481,834

(22) Filed: Oct. 5, 2023

(65) Prior Publication Data

US 2025/0116794 A1 Apr. 10, 2025

(51) Int. Cl.
*G01V 5/10* (2006.01)
*E21B 49/00* (2006.01)

(52) U.S. Cl.
CPC .............. *G01V 5/105* (2013.01); *E21B 49/00* (2013.01); *G01V 5/101* (2013.01)

(58) Field of Classification Search
CPC ......... E21B 49/00; G01V 5/101; G01V 5/105
See application file for complete search history.

(56) References Cited

U.S. PATENT DOCUMENTS

| | | | |
|---|---|---|---|
| 5,608,215 A | 3/1997 | Evans | |
| 10,162,079 B2 | 12/2018 | Tkabladze | |
| 2002/0170348 A1 | 11/2002 | Roscoe | |
| 2006/0284066 A1 | 12/2006 | Jacobson | |
| 2012/0016588 A1 | 1/2012 | Evans | |
| 2017/0146684 A1 | 5/2017 | Tkabladze | |
| 2020/0326451 A1 | 10/2020 | Schmid | |
| 2022/0252753 A1 * | 8/2022 | Zhang | E21B 49/00 |

* cited by examiner

*Primary Examiner* — Mark R Gaworecki
(74) *Attorney, Agent, or Firm* — Jeffrey D. Frantz

(57) ABSTRACT

A downhole tool is provided with a neutron generator configured to emit neutrons into a geological formation. The downhole tool includes one or more neutron detectors configured to detect neutrons that return to the downhole tool after interacting with the geological formation. The downhole tool also includes one or more gamma ray detectors configured to detect gamma rays from the geological formation that form when neutrons are inelastically scattered by the geological formation. Measurements from a combination of detectors of at least one of the one or more neutron detectors and at least one of the one or more gamma ray detectors are used to determine formation density. A first formation density determined using a first combination of detectors is used to compensate a second formation density determined using a second combination of detectors.

18 Claims, 7 Drawing Sheets

300

IRRADIATE A FORMATION WITH HIGH ENERGY NEUTRONS — 310

DETECT GAMMA RAYS FROM THE FORMATION — 320

DETECT NEUTRONS FROM THE FORMATION — 330

ANALYZE THE DETECTED GAMMA RAY COUNT AND THE DETECTED NEUTRON COUNT TO DETERMINE THE DENSITY OF FORMATION — 340

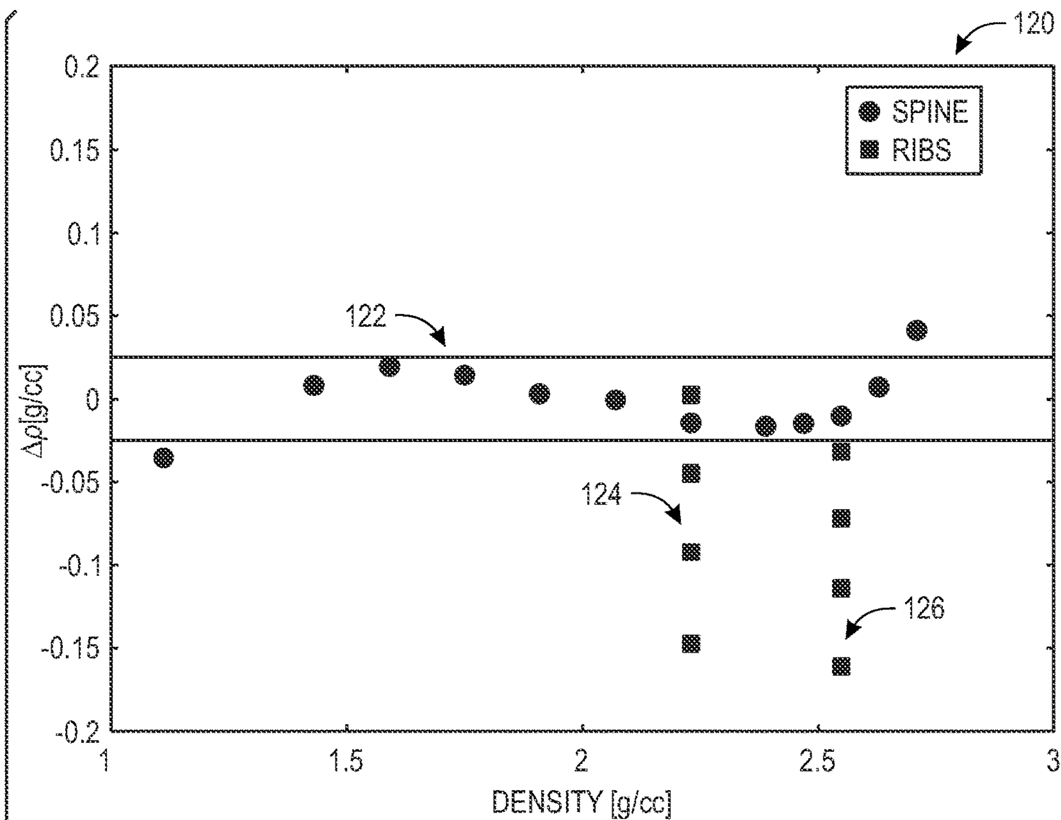
FIG. 4
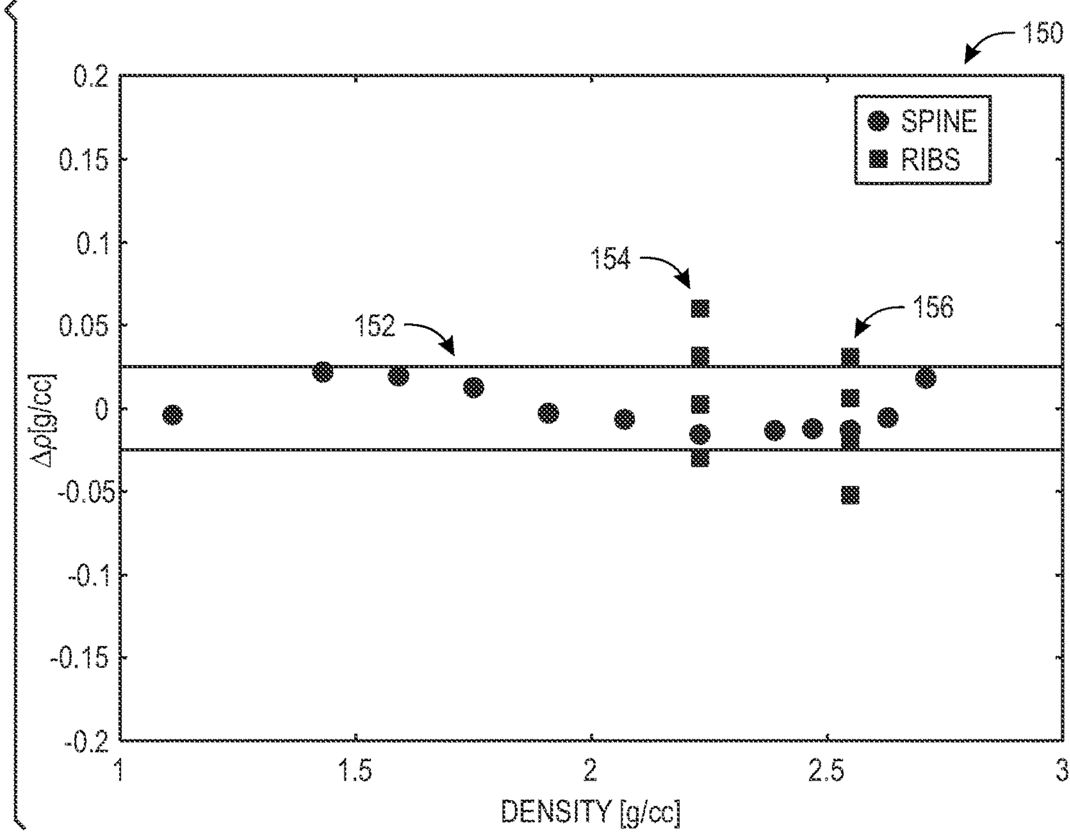

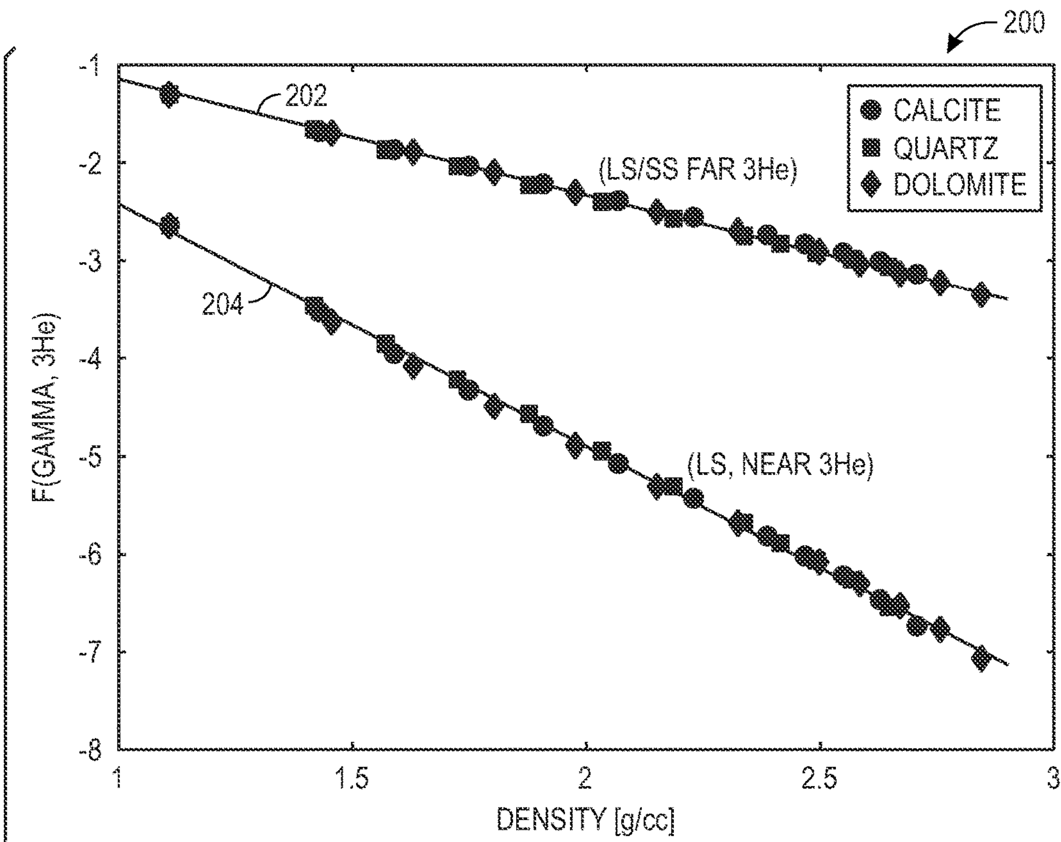
FIG. 6
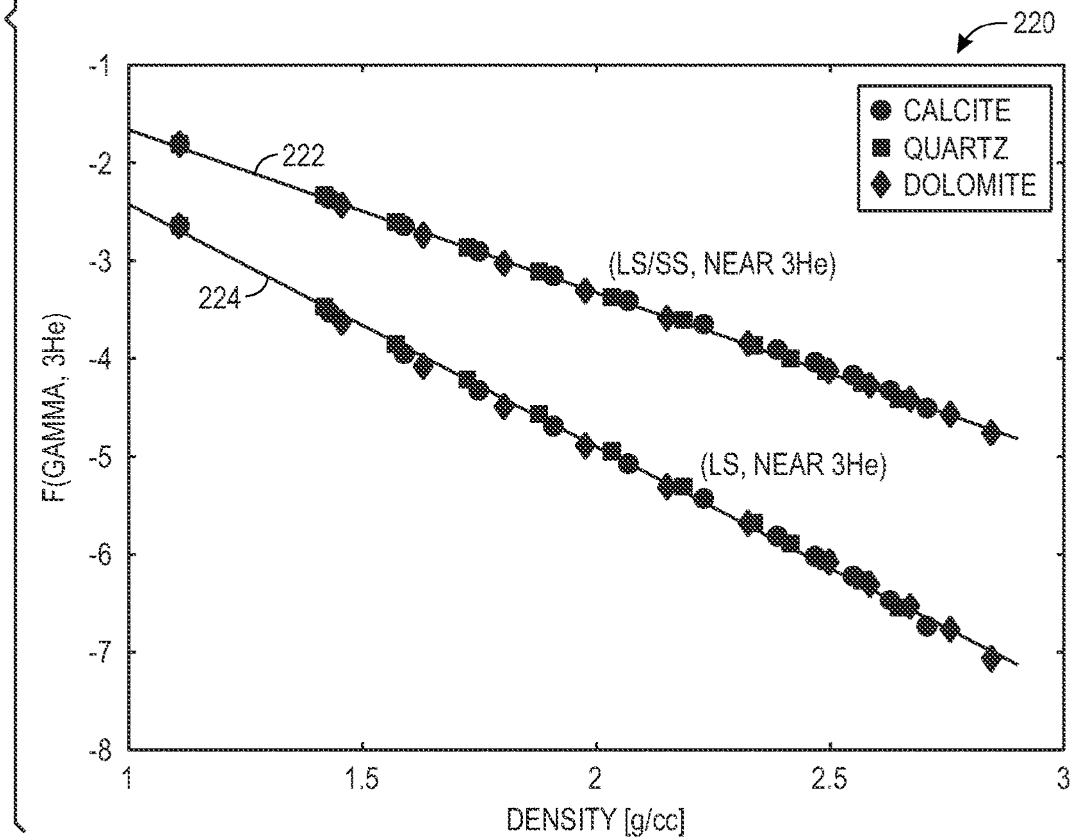

COMPENSATED NEUTRON GAMMA DENSITY

BACKGROUND

The present disclosure relates generally to well logging techniques and, more particularly, to a neutron-gamma density measurement that accounts for both liquid-filled and gas-filled formations.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Formation density is a crucial property of rocks for evaluating the hydrocarbon deposits. This property is usually determined by logging while drilling (LWD) during the drilling of a borehole through the formation in question, or wireline tools after the borehole has been drilled. The instrumentation that is used for these measurements usually contains a radioisotopic source (e.g., $^{137}$Cs or $^{241}$AmBe) of high energy photons (e.g., gamma rays) and radiation detectors. The formation density measurement involves the scattering of gamma-rays through the formation. Conventionally, a gamma density may be obtained by irradiating the formation with gamma-rays using the radioisotopic source (e.g., $^{137}$Cs). These gamma-rays may Compton scatter from the electrons present in the formation before being detected by a gamma-ray detector spaced some distance from the gamma-ray source. Since the electron concentration is proportional to the atomic number of the elements, and the degree to which the gamma-rays Compton scatter and return to the gamma-ray detector relates to the electron concentration, the density of the formation may be measured using this technique.

However, the use of radioisotopic sources such as $^{137}$Cs or $^{241}$AmBe may be undesirable in a downhole tool. Among other things, such radioaisotopic sources may present an environmental concern and may involve special handling requirements. Additionally, any gamma-ray source that is used in a cased-hole density measurement may emit gamma-rays that are attenuated strongly by the casing material, resulting in much fewer gamma-rays reaching the formation than otherwise. This gamma-ray attenuation may cause a cased-hole gamma-gamma density measurement to be impossible or inaccurate.

Some techniques have been developed to generate gamma-rays for a formation density measurement without using any radioisotopic gamma-ray sources. Instead, gamma-rays for a formation density measurement may be created when neutrons, emitted by an electronic neutron generator, inelastically scatter off certain elements in the formation. Such a formation density measurement may be referred to as a neutron-gamma density (NGD) measurement, as distinguished from the conventional gamma-gamma density (GGD) measurements that rely on radioisotopic gamma-ray sources. In an NGD measurement, fast neutrons may pass through borehole casing material to reach the formation, where these neutrons may inelastically scatter on oxygen and certain other atoms in the formation. This inelastic scattering produces high-energy gamma-rays that can be detected by the gamma-ray detectors in the tool. However, existing NGD techniques depend on environmental effects, tool standoff, mud cake thickness, or mud composition, and compensations may be desired to improve the accuracy of the formation density results.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Certain embodiments of the present disclosure include a downhole tool that includes a neutron generator configured to emit neutrons into a geological formation. The downhole tool also includes one or more neutron detectors configured to detect neutrons that return to the downhole tool after interacting with the geological formation. The downhole tool also includes one or more gamma ray detectors configured to detect gamma rays from the geological formation that form when neutrons are inelastically scattered by the geological formation. Measurements from a combination of detectors of at least one of the one or more neutron detectors and at least one of the one or more gamma ray detectors are used to determine formation density, and a first formation density determined using a first combination of detectors is used to compensate a second formation density determined using a second combination of detectors.

Certain embodiments of the present disclosure include a method that includes irradiating a geological formation, via a pulsed neutron generator, with neutrons; detecting gamma rays from the formation by using one or more gamma ray detectors located at different locations relative to the neutron generator; detecting neutrons from the formation by using one or more neutron detectors located at different locations relative to the neutron generator; and analyzing the detected gamma rays and the detected neutrons to determine a compensated formation density.

Certain embodiments of the present disclosure also include a system that includes a downhole tool and data processing circuitry associated with the downhole tool. The downhole tool includes a neutron generator configured to emit neutrons into a geological formation. The downhole tool also includes a first neutron detector and a second neutron detector located at different locations relative to the neutron generator, and the first and second neutron detectors are configured to detect neutrons that return to the downhole tool after interacting with the geological formation. The downhole tool also includes one or more gamma ray detectors configured to detect gamma rays from the geological formation that form when neutrons are inelastically scattered by the geological formation. The data processing circuitry is configured to calculate a first calculated formation density by using a first measurement of the first neutron detector and a measurement of a gamma ray detector of the one or more gamma ray detectors. The data processing circuitry is also configured to calculate a second calculated formation density by using a second measurement of the second neutron detector and the measurement of the gamma ray detector. The data processing circuitry is also configured to obtain a compensated formation density by using the first calculated formation density to compensate the second calculated formation density.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 4 is a plot illustrating residuals of spine and rib points at different formation densities, in accordance with an embodiment;

FIG. 6 includes two plots showing dependences of functional forms versus formation density for various categories of formations, in accordance with an embodiment;

DETAILED DESCRIPTION

Figure 1:
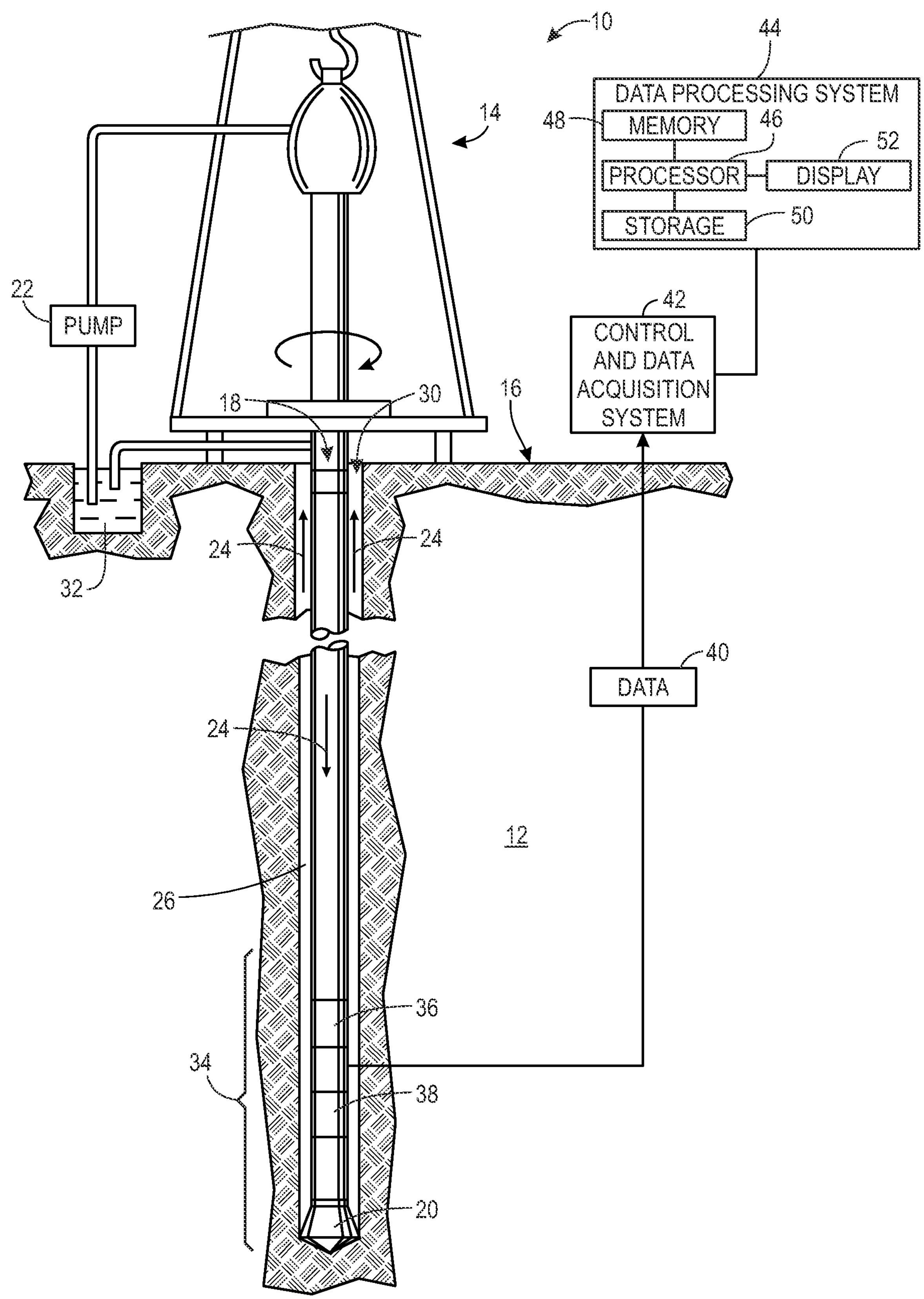
FIG. 1 is a block diagram of a drilling system for performing a neutron-gamma density (NGD) measurement, in accordance with an embodiment.

One or more specific embodiments of the present disclosure will be described below. These described embodiments are only examples of the presently disclosed techniques.

Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention). Indeed, although certain operations described herein may not be explicitly described as being performed continuously and/or automatically in substantially real time during operation of the computing system and/or equipment controlled by the computing system, it will be appreciated that these operations may, in fact, be performed continuously and/or automatically in substantially real time during operation of the computing system and/or equipment controlled by the computing system to improve the functionality of the computing system (e.g., by not requiring human intervention, thereby facilitating faster operational decision-making, as well as improving the accuracy of the operational decision-making by, for example, eliminating the potential for human error), as described in greater detail herein.

Present embodiments relate to systems and techniques for using different combinations of neutron and gamma ray detectors to get accurate formation density. For instance, a downhole tool for obtaining such an NGD measurement may include a neutron generator (e.g., a neutron D-T generator), one or more neutron detectors, one or more gamma-ray detectors, and data processing circuitry. When the downhole tool is lowered into a borehole of a subterranean formation, the neutron generator may irradiate neutrons into the formation, causing a fast neutron cloud to form. The neutron generator may emit neutrons into the formation for a brief period of time, referred to herein as an "burst gate," during which the neutrons may inelastically scatter off certain elements in the formation, (e.g., oxygen) to produce gamma-rays. The fast neutrons interact with borehole and formation atoms via inelastic and elastic scattering, followed by neutron capture. Both inelastic and capture reactions produce relatively high energy photons. Thus, the fast neutron cloud effectively creates secondary sources of photons in the formation. The photons from these secondary sources are attenuated by the formation before reaching the gamma detector(s). The main reactions of high energy photons with formation atoms are Compton scattering and pair production. The neutron detectors may detect a count of neutrons representing the extent of the neutron cloud. The gamma-ray detectors may detect counts of inelastic gamma-rays caused by neutrons that inelastically scatter off the formation. Since the quantity of inelastic gamma-rays that occur may depend upon the extent of the fast neutron cloud emitted by the neutron source, which itself may vary depending on the liquid-filled or gas-filled nature of the formation, the neutron detector of the downhole tool may measure the extent of the neutron cloud by obtaining a neutron count occurring during the burst gate. The inelastic gamma-rays detected by the gamma-ray detectors may be normalized to this count of neutrons. The data processing circuitry may determine the density of the formation based at least in part on the counts of inelastic gamma-rays normalized to the count of neutrons.

The neutron-photon transport in the NGD measurement is rather more complex than the conventional GGD measurement mentioned previously, and the detected photon counts depend not only on photon attenuation processes but also on neutron transport effect, as described in detail herein. In the NGD measurement, the secondary photon source strength is not constant. It depends on the intensity of the fast neutron cloud and the concentration of elastic scatterers in the formation. The extent of the neutron cloud itself depends on the density of inelastic scatterers and the hydrogen index. The effect of formation hydrogen content is very important. The elastic reaction of neutrons off hydrogen atoms does not produce any photons. Meanwhile, hydrogen is a very good moderator, and neutrons lose most energy on average after interaction with hydrogen atoms. The remaining energy of the neutrons after a couple of interactions with hydrogen is not enough for inelastic reactions with heavy elements. Therefore, hydrogen reduces the density of the neutron cloud without producing secondary photons. Accordingly, although both types of reactions reduce the concentration of fast neutrons, there is a clear difference between the effects, reduction of the neutron cloud by interacting with heavy elements and reduction of the neutron cloud by interacting with hydrogen. In the interaction of fast neutrons with heavy elements, the secondary source of photons is created; while in the interaction of fast neutrons with hydrogen atoms, fast neutrons are simply knocked out from the neutron-photon transport process and no secondary photons are produced.

The final dependence of observed photon counts versus formation density includes a combination of three main factors. The first factor depends on hydrogen concentration, or hydrogen index (HI), since hydrogen reduces the neutron cloud and effectively removes neutrons from the process. The second factor is connected to the concentration of heavy elements in the formation, since more heavy elements reduce the extent of the cloud of fast neutrons producing more secondary sources of photons. The third factor is a formation density, which defines photon attenuation from the secondary sources to the detectors. All these factors are correlated with each other. For example, the greater the hydrogen index, the fewer heavy elements are in the formation, and the lower the formation density. Accordingly, additional measurements are used to isolate the formation density effect and the dependence of the detector counts on the formation density. Existing NGD techniques depend on environmental effects, tool standoff, mud cake thickness, or mud composition, and compensations may be desired to improve the accuracy of the formation density results.

The disclosed embodiments provide systems and technique using the so-called spine and ribs approach to measure geological formation density by using a neutron-induced gamma ray spectroscopy logging tool. The geological formation density measured by a combination of detectors (e.g., long-spaced gamma ray detector and far neutron detector) may be compensated by another combination of detectors (e.g., short-spaced gamma ray detector and near neutron detector). The two combinations of detectors may have different radial sensitivities, which may be used to remove environmental effects (e.g., neutron transport effect) from the measurements. Accordingly, different combinations of detectors may be used to obtain accurate formation density. In addition, gamma rays generated outside of the geological formation may cause noise to the formation density calculation. The present disclosure includes measuring energy spectra of the detected gamma rays and determine the inelastic gamma-rays caused by neutrons that inelastically scatter off the heavy elements of the formation and neutron capture processes in the formation based on the energy spectra of the gamma rays. These inelastic gamma-rays may be used in the calculation of the formation density to reduce the noise caused by the gamma rays generated outside of the geological formation.

Different combinations of detectors may be used to obtain accurate formation density. For example, in some embodiments, only one gamma detector and two 3He detectors (e.g., far 3He detector and near 3He detector) may be used in the tool. The NGD measured by the two combinations of gamma detector and 3He detector (e.g., gamma detector and near 3He detector, gamma detector and far 3He detector) may be used to extract formation density. In some embodiments, at least two gamma detectors (e.g., long-spaced gamma detector and short-spaced gamma detector) and one or more 3He detector may be used in the tool. The NGD measurement measured by the long-spaced gamma detector may be compensated by the NGD measurement derived from the ratio of two gamma detectors (e.g., long-spaced gamma detector and short-spaced gamma detector) counts and one 3He detector (e.g., near 3He detector).

With the foregoing in mind, FIG. 1 illustrates a drilling system 10 having a neutron-induced gamma ray spectroscopy logging tool, as described in greater detail herein. The drilling system 10 may be used to drill a well into a geological formation 12 and obtain gamma ray spectroscopy measurements useful to identify characteristics of the well. In the drilling system 10 illustrated in FIG. 1, a drilling rig 14 at the surface 16 may rotate a drill string 18 having a drill bit 20 at its lower end. As the drill bit 20 is rotated, a drilling fluid pump 22 is used to pump drilling fluid 24, commonly referred to as "mud" or "drilling mud", downward through the center of the drill string 18 in the direction of the arrow to the drill bit 20. The drilling fluid 24, which is used to cool and lubricate the drill bit 20, exits the drill string 18 through the drill bit 20. The drilling fluid 24 then carries drill cuttings away from the bottom of a borehole 26 as it flows back to the surface 16, as illustrated by the arrows through an annulus 30 between the drill string 18 and the formation 12. However, as described above, as the drilling fluid 24 flows through the annulus 30 between the drill string 18 and the formation 12, the drilling fluid 24 may begin to invade and mix with the fluids stored in the formation 12, which may be referred to as formation fluid (e.g., natural gas or oil). At the surface 16, the return drilling fluid 24 may be filtered and conveyed back to a mud pit 32 for reuse.

As illustrated in FIG. 1, the lower end of the drill string 18 includes a bottom-hole assembly (BHA) 34 that may include the drill bit 20 along with various downhole tools. The downhole tools may collect a variety of information relating to the geological formation 12 and/or the state of drilling of the well. For example, a measurement-while-drilling (MWD) module 36 may measure certain drilling parameters, such as the temperature, pressure, orientation of the drilling tool, and so forth. Likewise, a logging-while-drilling (LWD) module 38 may measure the physical properties of the geological formation 12, such as density, porosity, resistivity, lithology, and so forth.

The LWD module 38 may collect a variety of data 40 that may be stored and processed within the LWD module 38 or, as illustrated in FIG. 1, may be sent to the surface for processing. In the example of this disclosure, the LWD module 38 may include a neutron-induced gamma ray spectroscopy logging tool that may detect the energies of formation gamma rays that result when neutrons are emitted into the well. The range of energies of the detected gamma rays may be visualized as a spectrum of the gamma rays that are detected. The data 40 that is collected may include counts and/or detected energies of neutrons and gamma rays that reach corresponding detectors in the LWD module 38. It should be appreciated that while the embodiment illustrated in FIG. 1 is directed to collecting data via an LWD module 38, in other embodiments, wireline tools may be used as the conveyance mode. In other words, the neutron-induced gamma ray spectroscopy logging tool may be deployed into the borehole 26 via logging-while-drilling (LWD), wireline, coiled tubing, or any other suitable mode of downhole conveyance.

The data 40 may be sent via a control and data acquisition system 42 to a data processing system 44. The control and data acquisition system 42 may receive the data 40 in any suitable way. In certain embodiments, the control and data acquisition system 42 may transfer the data 40 via electrical signals pulsed through the geological formation 12 or via mud pulse telemetry using the drilling fluid 24. In other embodiments, the data 40 may be retrieved directly from the LWD module 38 when the LWD module 38 returns to the surface. As described in greater detail herein, the control and data acquisition system 42 may be configured to estimate porosity using neutron-induced gamma ray spectroscopy data 40 provided by the LWD module 38. In addition, in certain embodiments, the control and data acquisition system 42 may be configured to control any and all operational parameters of the BHA 34 including, but not limited to, operations of a neutron-induced gamma ray spectroscopy logging tool of the LWD module 38, as described in greater detail herein.

In certain embodiments, the data processing system 44 may include a processor 46, memory 48, storage 50, and/or a display 52. The data processing system 44 may use the data 40 to determine various properties of the formation 12 using any suitable techniques. As will be described in greater detail herein, the LWD module 38 may use certain selected materials to reduce signal contamination by stray neutrons. Thus, when the data processing system 44 processes the data 40, the determined formation properties may be more accurate and/or precise than otherwise. To process the data 40, the processor 46 may execute instructions stored in the memory 48 and/or storage 50. As such, the memory 48 and/or the storage 50 of the data processing system 44 may be any suitable article of manufacture that can store the instructions. The memory 48 and/or the storage 50 may be ROM memory, random-access memory (RAM), flash memory, an optical storage medium, or a hard disk drive, to name a few examples. The display 52 may be any suitable electronic display that can display logs and/or other information relating to properties of the formation 12 as measured by the LWD module 38. It should be appreciated that, although the data processing system 44 is illustrated as being located at the surface, the data processing system 44 may be located in the LWD module 38. In such embodiments, some of the data 40 may be processed in the LWD module 38 and the data 40 may be stored in the LWD module 38, while some of the data 40 may be sent to the surface in real time. This may be the case particularly in LWD, where a limited amount of the data 40 may be transmitted to the surface during drilling or reaming operations.

Figure 2:
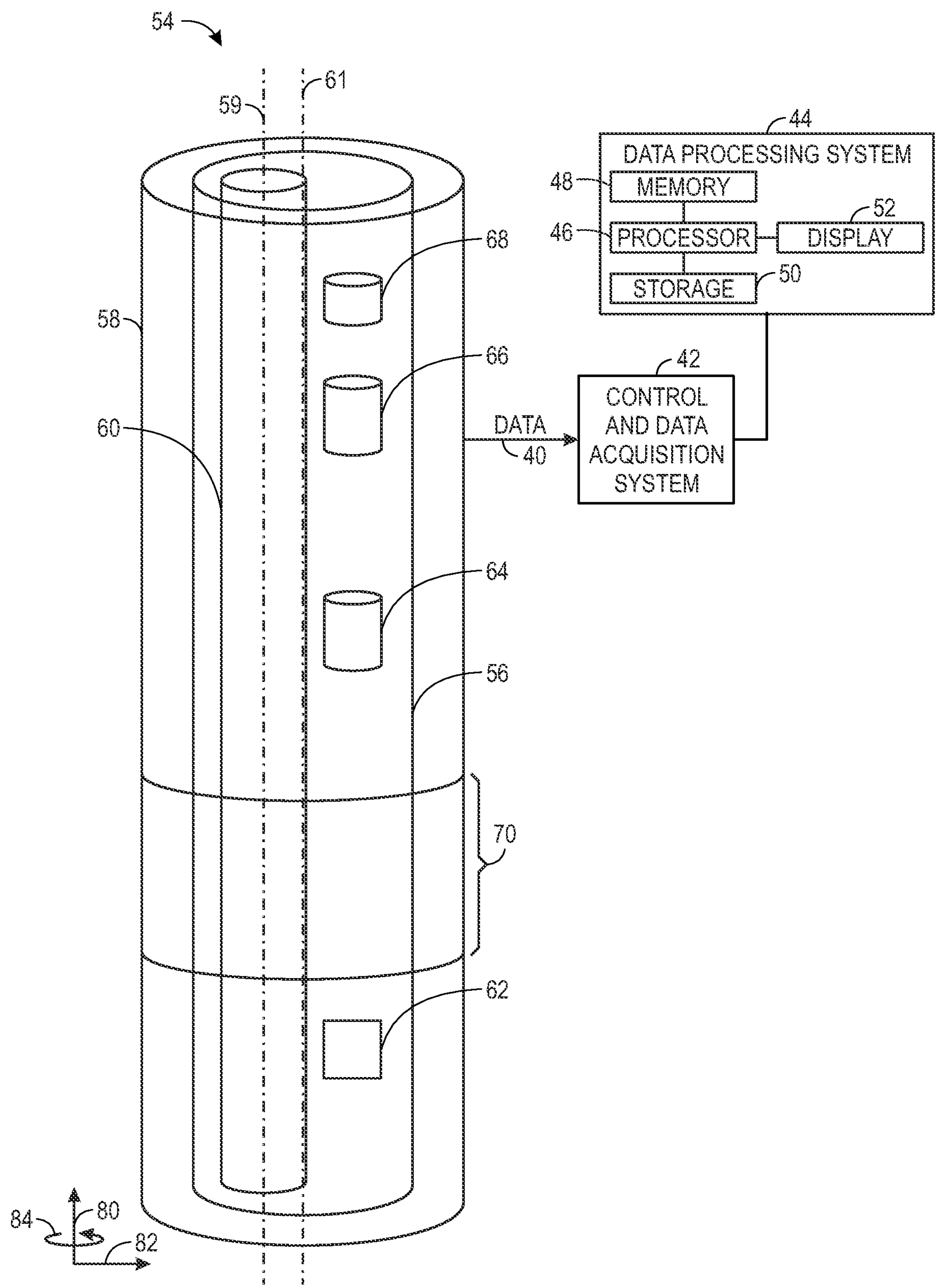
FIG. 2 is a schematic block diagram showing a perspective view of a neutron-induced gamma ray spectroscopy logging tool used in the drilling system of FIG. 1, in accordance with an embodiment.

As described in greater detail herein, the LWD module 38 may be or include a neutron-induced gamma ray spectroscopy logging tool. FIG. 2 illustrates a schematic block diagram showing a perspective view of an illustrative embodiment of the LWD module 38 being or including a neutron-induced gamma ray spectroscopy logging tool 54. In certain embodiments, the spectroscopy logging tool 54 may include a chassis 56 (e.g., annular chassis), a collar 58 (e.g., annular collar), and a flow tube 60 (e.g., annular flow tube) that extends through the spectroscopy logging tool 54. To facilitate discussion, the spectroscopy logging tool 54 and its components may be described with reference to an axial axis or direction 80 (e.g., a co-axis of the collar 58 and the chassis 56), a radial axis or direction 82, and a circumferential axis or direction 84. In certain embodiments, a neutron source 62 is located at a first location within the spectroscopy logging tool 54, a near 3He detector 64 is located at a second location axially spaced from the neutron source 62 along the axis 80, a far 3He detector 66 is located at a third location axially spaced from the neutron source 62 along the axis 80, with the third location farther away from the neutron source 62 along the axis 80 than the second location. In addition, a long-spaced (LS) gamma ray detector 68 is located at a fourth location axially spaced from the neutron source 62 along the axis 80, with the fourth location farther away from the neutron source 62 along the axis 80 than the third location. In some embodiments, the neutron source 62, the near 3He detector 64, the far 3He detector 66, and the LS gamma ray detector 68 may be aligned along a same axis on the direction 80. In some embodiments, the neutron source 62, the near 3He detector 64, the far 3He detector 66, and the LS gamma ray detector 68 may not be aligned along a same axis. In addition, in certain embodiments, a neutron shield 70 (e.g., such as a boron shield) may be disposed about the spectroscopy logging tool 54 at or near the second location. The flow tube 60 may be along the axis 80, and a center symmetric axis 59 of the flow tube 60 may be offset from a center symmetric axis 61 of the collar 58 along the radial axis 82. Specifics regarding this embodiment and other embodiments of spectroscopic logging tools employing the general configuration or aspects of the LWD module 38 and the spectroscopy logging tool 54 are envisaged for use with any suitable means of conveyance, such as wireline, coiled tubing, logging while drilling (LWD), and so forth. Further, information regarding the environment, such as the sigma of the formation 12, sigma of the drilling fluid 24, density, borehole size, and slowdown length, may be acquired using additional equipment.

In general, neutrons emitted by the neutron source 62 may interact with the surrounding formation 12 in ways that produce gamma rays through inelastic scattering and/or neutron capture. Inelastic scattering may produce gamma rays through interactions with fast neutrons and elements of the formation 12. Neutron capture may produce gamma rays from the capture of mostly thermal and epithermal neutrons by a nucleus. The formation gamma rays may be detected by the LS gamma ray detector 68. In certain embodiments, the LS gamma ray detector 68 may include scintillation detectors having a scintillation crystal and a photomultiplier. In certain embodiments, the gamma ray detector 68 may detect the spectra—that is, the range of energies—of the formation gamma rays. The nuclear spectroscopy provided by the spectroscopy logging tool 54 illustrated in FIG. 2 may provide a wealth of information on the elemental composition of materials around the spectroscopy logging tool 54. In certain embodiments, an electronic, pulsed neutron generator (PNG) of the neutron source 62 may create pulses of energetic neutrons that interact with surrounding nuclei to induce gamma rays. In general, the LS gamma ray detector 68 of the spectroscopy logging tool 54 detect the energy spectra of these gamma rays. As described in greater detail herein, the control and data acquisition system 42 may analyze the energy spectra to provide separate spectra for inelastic and capture reactions, each carrying complementary information from different sets of elements (e.g., elemental components of the surrounding formation 12). The elemental yields from these spectra respond to the geochemistry of the formation rock as well as solid organic matter, pore fluids, and the borehole 26.

However, in certain embodiments, the LS gamma ray detector 68 may detect gamma rays that occur in the borehole 26 or the spectroscopy logging tool 54 itself. For example, other gamma rays may be generated due to neutron transport effect, for example, by neutrons reacting with elements of the drilling fluid 24 in the borehole 26, the neutron shield 70, the chassis 56, the collar 58, the gamma ray detector 68 themselves, drilling fluid 24 within the flow tube 60, and/or the flow tube 60 itself, to name only a few locations from which additional gamma rays may be generated. The gamma rays generated through these reactions outside of the formation 12 may not provide substantial information regarding the properties of the geological formation 12. As such, in certain embodiments, the spectra of these gamma rays generated outside of the geological formation 12 may represent noise to be subtracted from the overall spectral signal by the control and data acquisition system 42.

In certain embodiments, two different NGDs models may be constructed by using the LS gamma ray detector 68 with the near 3He detector 64 and the far 3He detector 66, respectively. The two NGDs models may have different sensitivity to the formation density due to the difference in locations of the near 3He detector 64 and the far 3He detector 66. The calculated formation densities of the two NGDs may generally be equal. However, in certain embodiments, the calculated formation densities of the two NGDs may have different values due to the neutron transport effect described above, as illustrated in FIG. 3. A functional form of detector count rate may be used to describe combinations of counts of the LS gamma ray detector 68 with the two 3He detectors, the near 3He detector 64 and the far 3He detector 66, as described in Equation [1].

$$F(\text{gamma}, {}^3He) = a(\log(\text{gamma}) - c((\log(3He^d) - e)) + b \quad [1]$$

Figure 3:
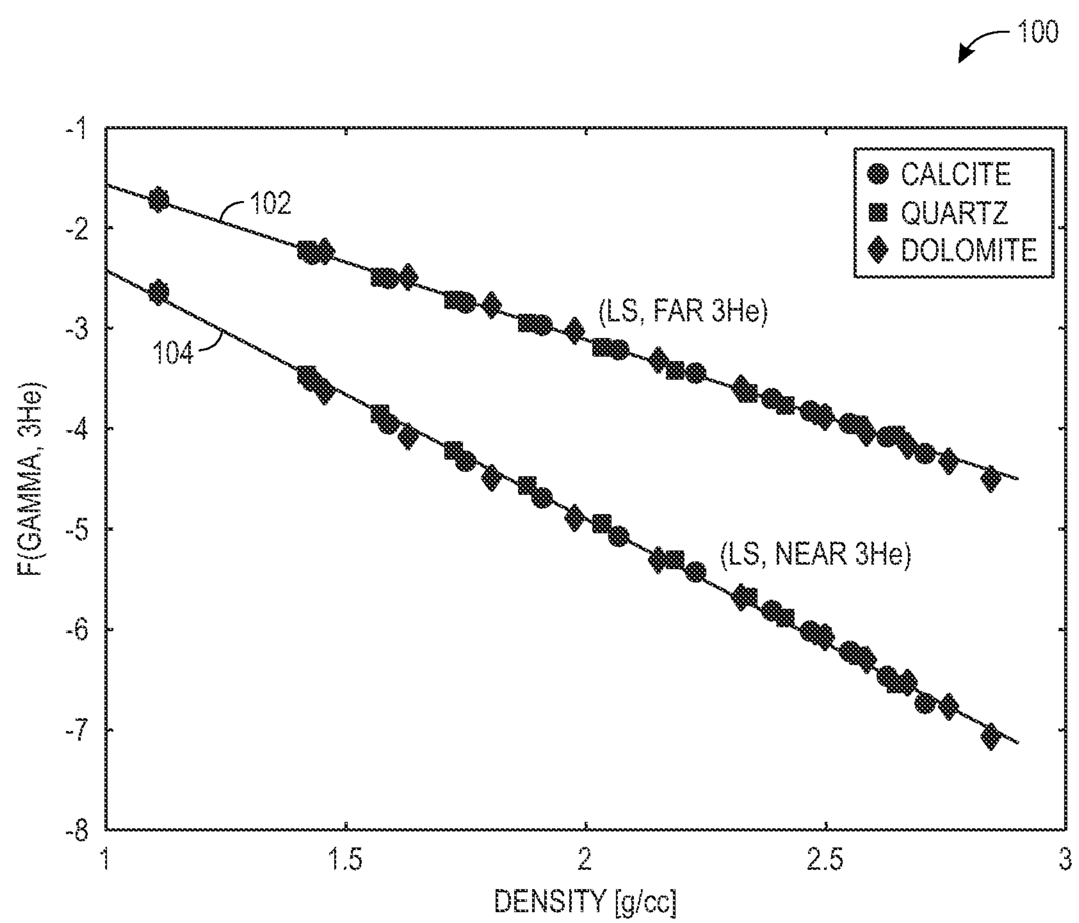
FIG. 3 is a plot showing dependence of a functional form versus formation density for various categories of formations, in accordance with an embodiment.

In Equation [1], the term "gamma" is used to represents counts of the LS gamma ray detector 68, the term "3He" is used to represents counts of the 3He detectors (e.g., the near 3He detector 64, the far 3He detector 66), and the parameters "a", "b", "c", "d", and "e" are coefficients (e.g., constants of any real number) that may be determined by fitting the measurement data points. According to Equation [1], F(LS, near 3He), corresponding to a combination of the counts of the LS gamma ray detector 68 with the near 3He detector 64, and F(LS, far 3He), corresponding to a combination of the counts of the LS gamma ray detector 68 with the far 3He detector 66, may be calculated based on the measurements at corresponding detectors. F(LS, near 3He) and F(LS, far 3He) may be dependent on the formation density and may be used in a spine-ribs approach to obtain an accurate result of the formation density. In the spine-ribs approach, spine points of F(LS, near 3He) and F(LS, far 3He) are under nominal conditions. When the neutron transport effect is not removed completely from the gamma detector counts, the calculated formation densities using F(LS, near 3He) and F(LS, far 3He) are different from each other and are not equal to the formation density, as illustrated in FIG. 3. For example, a density difference (Δρ) between the calculated formation density using F(LS, near 3He) and the formation density may be described by Equation [2].

$$\Delta\rho = \rho_{formation} - \rho_{near} = f(\rho_{near} - \rho_{far}) \quad [2]$$

In Equation [2], $\rho_{formation}$ corresponds to the compensated or corrected density of the formation, $\rho_{near}$ corresponds to the calculated formation density using F(LS, near 3He), while $\rho_{far}$ corresponds to the calculated formation density using F(LS, far 3He). In Equation [2], $f(\rho_{near}-\rho_{far})$ corresponds to a function of $(\rho_{near}-\rho_{far})$. Accordingly, the density of the formation may be obtained by using the $\rho_{near}$ and the density difference (Δρ), as described in Equation [3].

$$\rho_{formation} = \rho_{near} + \Delta\rho \quad [3]$$

In the spine-rib approach, rib points may correspond to density differences at corresponding particular conditions (e.g., different borehole fluids).

FIG. 3 is a plot 100 showing dependence of F(gamma, 3He) versus formation density (DENSITY) (e.g., unit of g/cc) for various categories of formations (e.g., calcite, quartz, dolomite). As illustrated in FIG. 3, dependence of F(LS, far 3He) versus the formation density may be described by a curve 102 obtained by fitting corresponding measurement data points of F(LS, far 3He), and dependence of F(LS, near 3He) versus the formation density may be described by a curve 104 obtained by fitting corresponding measurement data points of F(LS, near 3He). As illustrated in FIG. 3, values of F(LS, near 3He) and F(LS, far 3He) are not equal at a same formation density, which is an indication that the neutron transport effect is not removed completely from the gamma detector counts. In an ideal case, if the photon transport is isolated by completely removing the neutron transport, the curve 102 and the curve 104 may give the same dependence on the formation density, and the calculated formation densities for both curves 102 and 104 may have a zero density difference (Δρ), according to Equation [2]. Values of F(LS, near 3He) and F(LS, far 3He) may be used to calculate corresponding formation density, which may be used to obtain the compensated formation density, as described in greater detail herein.

FIG. 4 shows a plot 120 illustrating residuals of spine and rib points for density differences (Δρ) of F(LS, near 3He) at different formation densities (DENSITY). In FIG. 4, spine points 122 in the plot 120 may correspond to water filed calcite formations having different formation densities (e.g., 0 to 100 pu), which may be determined using experimental measurements and may be used as base line for calculating rib points. Rib points 124 may correspond to a first porosity (e.g., 10 pu) of the formation using four types of borehole fluid (e.g., 10 ppg, 12 ppg, 14 ppg, and 16 ppg barite muds). Rib points 126 may correspond to a second porosity (e.g., 40 pu) of the formation using the same four types of borehole fluid (e.g., 10 ppg, 12 ppg, 14 ppg, and 16 ppg barite muds). FIG. 4 also shows a plot 150 illustrating residuals of spine and rib points for density differences (Δρ) of F(LS, far 3He) at different formation densities (DENSITY). In FIG. 4, spine points 152 in the plot 150 may correspond to calcite formations having different formation densities, which may be determined using experimental measurements and may be used as base line for calculating rib points. Rib points 154 may correspond to a first porosity (e.g., 10 pu) of the formation using four types of borehole fluid (e.g., 10 ppg, 12 ppg, 14 ppg, and 16 ppg barite muds). Rib points 156 may correspond to a second porosity (e.g., 40 pu) of the formation using the same four types of borehole fluid (e.g., 10 ppg, 12 ppg, 14 ppg, and 16 ppg barite muds). As illustrated in FIG. 4, residuals of spine and rib points for density differences (Δρ) of F(LS, near 3He) and F(LS, far 3He) are different, which is an indication that formation densities obtained using different combinations of gamma and 3He detectors (e.g., F(LS, near 3He), F(LS, far 3He)) have different radial sensitivity. According to Equation [2], measurements of a combination of gamma and 3He detectors (e.g., F(LS, far 3He)) may be used to compensate for measurements of the other combination of gamma and 3He detectors (e.g., F(LS, near 3He)), and the formation density may be obtained by using Equation [3].

Figure 5:
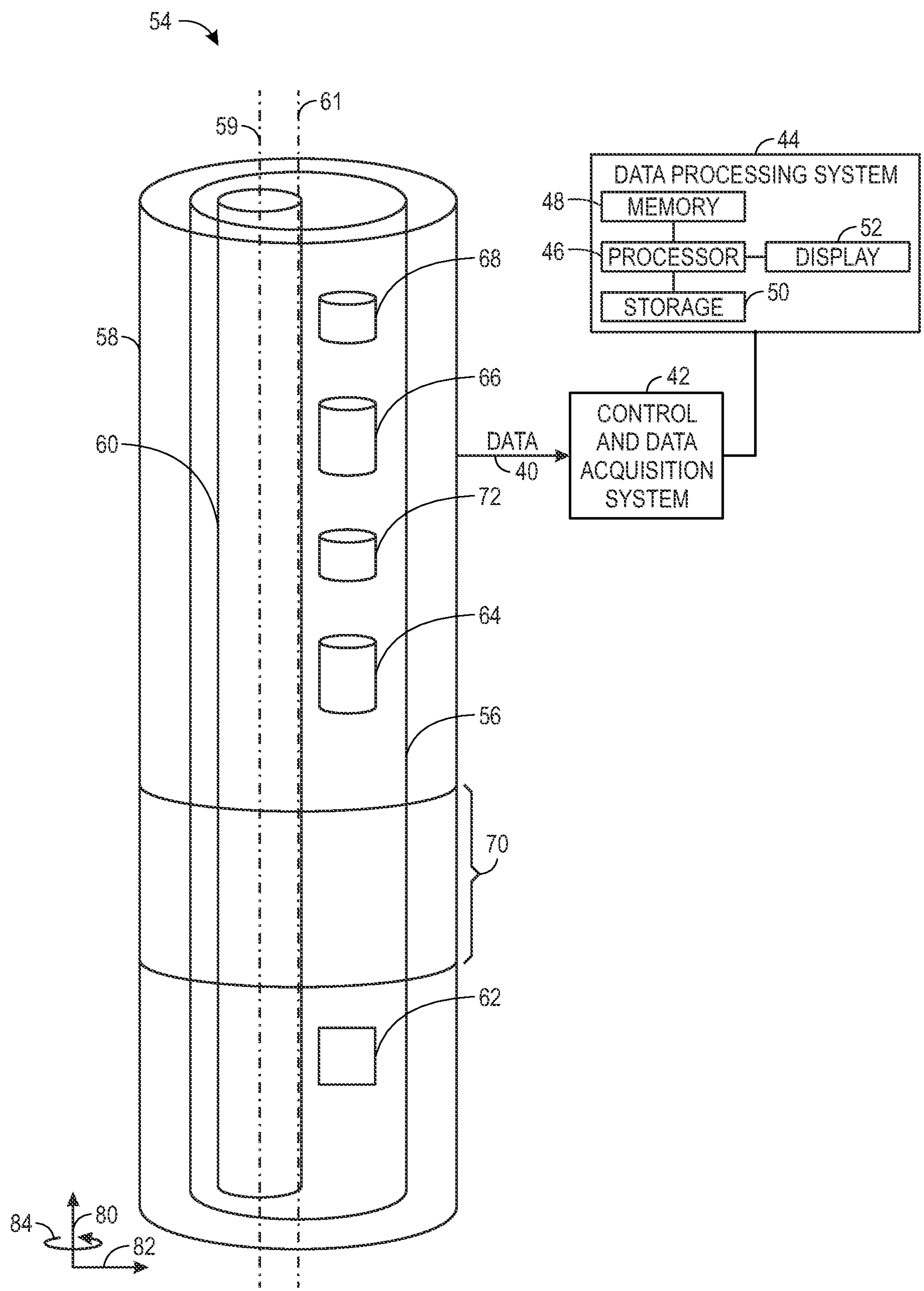
FIG. 5 is a schematic block diagram showing a perspective view of another neutron-induced gamma ray spectroscopy logging tool used in the drilling system of FIG. 1, in accordance with an embodiment.

In certain embodiments, two gamma ray detectors may be used in the spine-ribs approach, as illustrated in FIG. 5. FIG. 5 illustrates a schematic block diagram showing a perspective view of another illustrative embodiment of the LWD module 38 being or including a neutron-induced gamma ray spectroscopy logging tool 54, in which a short-spaced (SS) gamma ray detector 72 is located at a fifth location axially spaced from the neutron source 62 along the axis 80, with the fifth location farther away from the neutron source 62 along the axis 80 than the second location but closer than the third location. Accordingly, a relationship may be used to describe combinations of a ratio of counts of the LS gamma ray detector 68 to counts of the SS gamma ray detector 72 with the two 3He detectors, the near 3He detector 64 and the far 3He detector 66, as described in Equation [4].

$$F(LS/SS, {}^{3}He) = a\left(\log(gLS/SS) - c\left(\left(\log(3He^{d}) - e\right)\right) + b\right) \quad [4]$$

In Equation [4], the term "LS/SS" is used to represents the ratio of counts of the LS gamma ray detector 68 to counts of the SS gamma ray detector 72, the term "3He" is used to represents counts of the 3He detectors (e.g., the near 3He detector 64, the far 3He detector 66), and the parameters "a", "b", "c", "d", and "e" are coefficients (e.g., constants of any real number) that may be determined by fitting the measurement data points. According to Equation [4], F(LS/SS, near 3He) is corresponding to a combination of the ratio of counts of the LS gamma ray detector 68 to counts of the SS gamma ray detector 72 with the near 3He detector 64; and F(LS/SS, far 3He) is corresponding to a combination of the ratio of counts of the LS gamma ray detector 68 to counts of the SS gamma ray detector 72 with the far 3He detector 66. F(LS/SS, near 3He) and F(LS/SS, far 3He) may be determined based on measurements at corresponding detectors by fitting the measurement data points, as illustrated in FIG. 6. F(LS/SS, near 3He) and F(LS/SS, far 3He) may be dependent on the formation density and may be used in a spine-ribs approach to obtain an accurate result of the formation density. In this spine-ribs approach, spine points correspond to measurements of F(LS/SS, near 3He) and F(LS/SS, far 3He) under a nominal condition. When the neutron transport effect is not removed completely from the gamma detector counts, the calculated formation densities using different combination of gamma detectors and 3He detectors (e.g., F(LS/SS, near 3He), F(LS/SS, far 3He), F(LS, near 3He), F(LS, far 3He), F(SS, near 3He), F(SS, far 3He)), are different from each other, as illustrated in FIG. 6. Then, measurements of a combination of gamma and 3He detectors may be used to compensate for measurements of other combinations of gamma and 3He detectors, and a compensated formation density may be obtained by using a corresponding density difference (Δρ) and the calculated formation density for the combination of gamma and 3He detectors (similar to equation [3] with $\rho_{near}$ replaced with the calculated formation density). It should be noted that, in some embodiments, the neutron source 62, the near 3He detector 64, the far 3He detector 66, the LS gamma ray detector 68, and the SS gamma ray detector 72 may be aligned along a same axis on the direction 80; while in other embodiments, the neutron source 62, the near 3He detector 64, the far 3He detector 66, the LS gamma ray detector 68, and the SS gamma ray detector 72 may not be aligned along a same axis.

FIG. 6 includes a plot 200 showing dependence of F(gamma, 3He) versus formation density (DENSITY) (e.g., unit of g/cc) for various categories of formations (e.g., calcite, quartz, dolomite) for F(LS/SS, far 3He) and F(LS, near 3He). In the plot 200, dependence of F(LS/SS, far 3He) versus the formation density may be described by a curve 202 obtained by fitting corresponding measurement data points of F(LS/SS, far 3He), and dependence of F(LS, near 3He) versus the formation density may be described by a curve 204 obtained by fitting corresponding measurement data points of F(LS, near 3He). As illustrated in the plot 200, values of F(LS, near 3He) and F(LS/SS, far 3He) are not equal at a same formation density, which is an indication that the neutron transport effect is not removed completely from the gamma detector counts. In an ideal case, if the photon transport is isolated by completely removing the neutron transport, then the curve 202 and the curve 204 may give the same dependence on the formation density, and the calculated formation densities for both curves 202 and 204 may have a zero density difference (Δρ). Values of F(LS, near 3He) and F(LS/SS, far 3He) may be used to calculate corresponding formation density, which may be used to obtain the compensated formation density, as described in greater detail herein.

FIG. 6 also includes a plot 220 showing dependence of F(gamma, 3He) versus formation density (DENSITY) (e.g., unit of g/cc) for various categories of formations (e.g., calcite, quartz, dolomite) for F(LS/SS, near 3He) and F(LS, near 3He). In this embodiment, only one neutron detector may be used (e.g., the near 3He detector 64). In the plot 220, dependence of F(LS/SS, near 3He) versus the formation density may be described by a curve 222 obtained by fitting corresponding measurement data points of F(LS/SS, near 3He), and dependence of F(LS, near 3He) versus the formation density may be described by a curve 224 obtained by fitting corresponding measurement data points of F(LS, near 3He). As illustrated in the plot 220, values of F(LS, near 3He) and F(LS/SS, near 3He) are not equal at a same formation density, which is an indication that the neutron transport effect is not removed completely from the gamma detector counts. In ideal case, if the photon transport is isolated by completely removing the neutron transport, then the curve 222 and the curve 224 may give the same dependence on the formation density, and the calculated formation densities for both curves 222 and 224 may have a zero density difference (Δρ). Values of F(LS, near 3He) and F(LS/SS, near 3He) may be used to calculate corresponding formation density, which may be used to obtain the compensated formation density, as described in greater detail herein.

Figure 7:
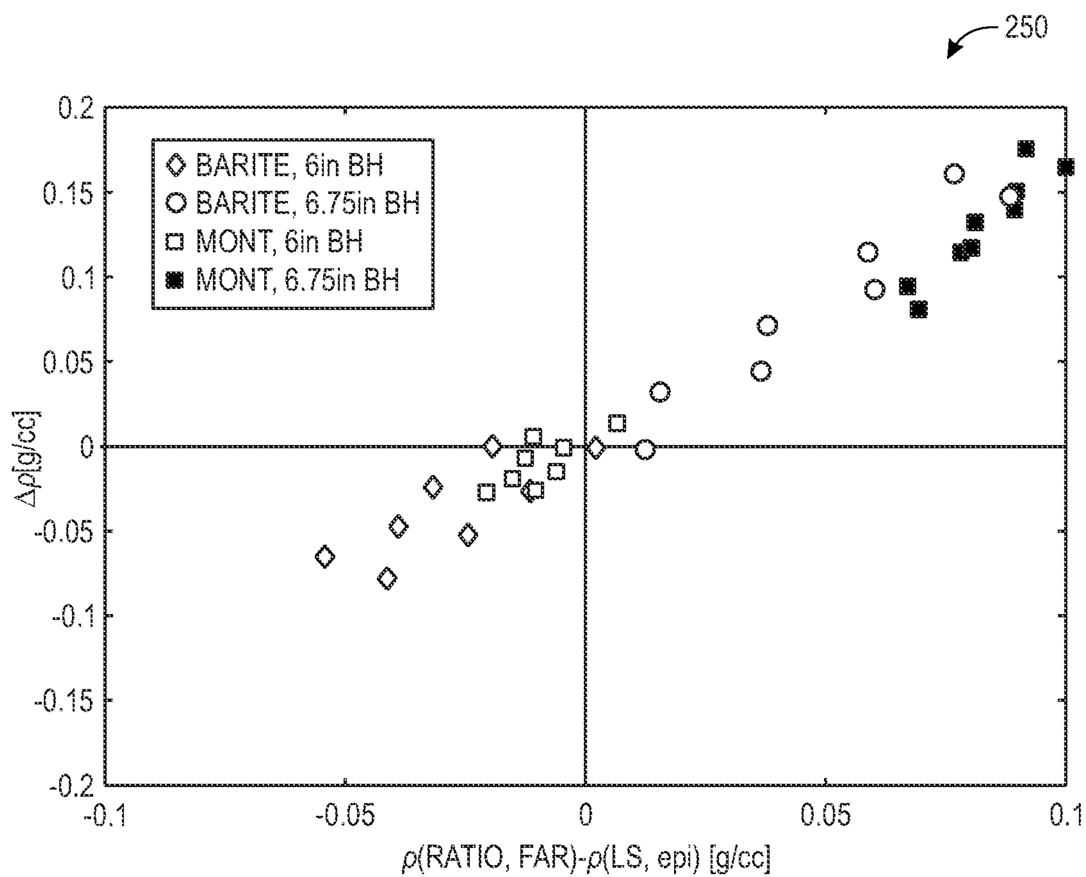
FIG. 7 is a plot showing rib points for density differences corresponding to different mud types, mud weight, or borehole size, in accordance with an embodiment.

FIG. 7 is a plot 250 showing rib points for density differences (Δρ) of F(LS, near 3He) versus (ρ(LS/SS, far)−ρ(LS, near)) corresponding to different mud types, mud weight, or borehole size (e.g., barite with 6 in borehole, barite with 6.75 in borehole, montmorillonite (MONT) with 6 in borehole, montmorillonite (MONT) with 6.75 in borehole). The density ρ(LS/SS, far) corresponds to a formation density calculated (spine points) using a ratio of the gamma detector counts (long-spaced versus short-spaced) and counts of the far 3He detector 66. The density p (LS, near) corresponds to a formation density calculated (spine points) using counts of the LS gamma ray detector 68 and counts of the near 3He detector 64. The neutron transport effects from the ratio of the gamma detector counts may be removed by using counts of the near 3He detectors 64. Then the density differences (Δρ) of F(LS, near 3He) may be described by Equation [5].

$$\Delta\rho = \rho_{formation} - \rho_{(LS,near)} = f\left(\rho_{(LS,near)} - \rho_{(LS/SS,far)}\right) \quad [5]$$

The density differences (Δρ) may be determined by fitting the measurement data points in the plot 250 based on Equation [5]. Since the density ρ(LS/SS, far) has different formation sensitivity than ρ(LS, near), one of them may be used to compensate for the measurement of the other. Accordingly, the compensated density of the formation may be obtained by using the $\rho_{(LS,near)}$ and the determined density difference (Δρ), as described in Equation [6].

$$\rho_{formation} = \rho_{(LS,near)} + \Delta\rho \quad [6]$$

Figure 8:
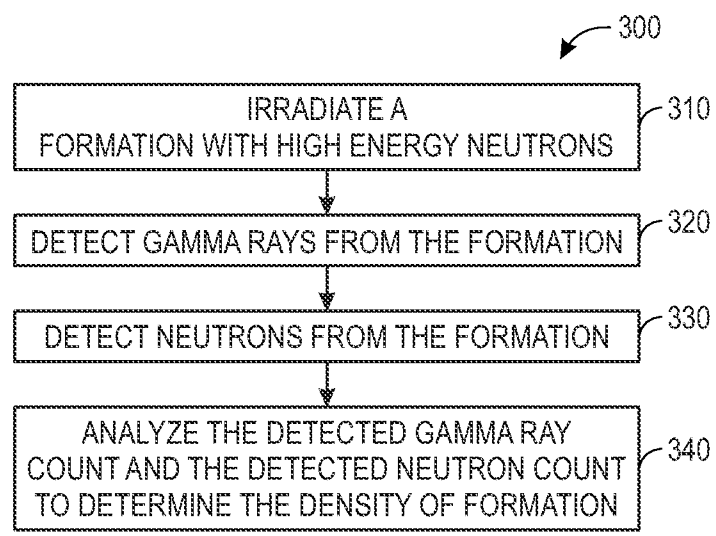
FIG. 8 is a flowchart of a method for determining a compensated formation density, in accordance with an embodiment.

FIG. 8 is a flowchart of a method 300 for determining a compensated formation density. At block 310, a neutron generator (e.g., neutron generator 62) may be controlled (e.g., by the control and data acquisition system 42) to irradiate neutrons into the formation 12, causing a fast neutron cloud to form. The neutron generator may be a pulsed neutron generator, which may emit neutrons into the formation 12 for a brief period of time during which the neutrons may inelastically scatter off certain elements in the formation 12, (e.g., oxygen) to produce gamma-rays (relatively high energy photons). At block 320, one or more gamma ray detectors (e.g., SS gamma ray detector 72, LS gamma ray detector 68) may be used (e.g., by the control and data acquisition system 42) to detect a count of gamma rays from the formation 12. At block 330, one or more neutron detectors (e.g., near 3He detector 64, far 3He detector 66) may be used (e.g., by the control and data acquisition system 42) to detect a count of neutrons from the formation 12. The gamma rays and neutrons measurements from the block 320 and the block 330 may be included in the data 40 and sent via the control and data acquisition system 42 to the data processing system 44. At block 340, the processor 46 may analyze the detected gamma ray count and the detected neutron count to determine the compensated density of formation using the method described above. For instance, the processor 46 may calculated the compensated density of formation based on Equations [1] to [5]. In some embodiments, computer models/software may be used to calculate the compensated density of formation based on Equations [1] to [5], and instructions of the operations may be stored in the memory 48. The calculated and/or the compensated density of formation may be stored in the storage 50. The logs and/or other information relating to properties of the formation 12 (e.g., FIG. 3, FIG. 4, FIG. 6) may be displayed on the display 52.

Technical effects of the invention include systems and methods for using the so-called spine and ribs approach to measure geological formation density by using a neutron-induced gamma ray spectroscopy logging tool. The geological formation density measured by a combination of detectors (e.g., long-spaced gamma ray detector and far neutron detector) may be compensated by another combination of detectors (e.g., short-spaced gamma ray detector and near neutron detector). The two combinations of detectors may have different radial sensitivities, which may be used to remove environmental effects (e.g., neutron transport effect) from the measurements. Accordingly, different combinations of detectors may be used to obtain accurate formation density. In addition, energy spectra of the gamma rays may be measured, and inelastic gamma-rays caused by neutrons that inelastically scatter off the heavy elements of the formation and neutron capture processes in the formation may be determined, which may be used in the calculation of the formation density to reduce the noise caused by gamma rays generated outside of the geological formation.

The subject matter described in detail above may be defined by one or more clauses, as set forth below.

A downhole tool includes a neutron generator configured to emit neutrons into a geological formation. The downhole tool also includes one or more neutron detectors configured to detect neutrons that return to the downhole tool after interacting with the geological formation. The downhole tool also includes one or more gamma ray detectors configured to detect gamma rays from the geological formation that form when neutrons are inelastically scattered by the geological formation. Measurements from a combination of detectors of at least one of the one or more neutron detectors and at least one of the one or more gamma ray detectors are used to determine formation density, and a first formation density determined using a first combination of detectors is used to compensate a second formation density determined using a second combination of detectors.

The downhole tool of any preceding clause, wherein the neutron generator includes a pulsed neutron generator configured to generate pulses of energetic neutrons.

The downhole tool of any preceding clause, wherein the one or more neutron detectors include a first neutron detector and a second neutron detector located at different locations relative to the neutron generator.

The downhole tool of any preceding clause, wherein the one or more gamma ray detectors include a gamma ray detector located at a different location from the one or more neutron detectors relative to the neutron generator.

The downhole tool of any preceding clause, wherein a first measurement of the first neutron detector and a measurement of the gamma ray detector are used to obtain a first calculated formation density, and a second measurement of the second neutron detector and the measurement of the gamma ray detector are used to obtain a second calculated formation density.

The downhole tool of any preceding clause wherein the first calculated formation density is used to compensate the second calculated formation density to obtain a compensated formation density.

The downhole tool of any preceding clause, wherein the one or more gamma ray detectors include a first gamma ray detector and a second gamma ray detector located at different locations relative to the neutron generator.

The downhole tool of any preceding clause, wherein the one or more neutron detectors include a neutron detector located at a different location relative to the neutron generator than the one or more gamma ray detectors.

The downhole tool of any preceding clause, wherein a first measurement of the first gamma ray detector and a second measurement of the second gamma ray detector are used to obtain a ratio measurement, the ratio measurement is used with a measurement of the neutron detector to calculate a particular formation density, and the second measurement of the second gamma ray detector and the measurement of the neutron detector are used to obtain a calculated formation density.

The downhole tool of any preceding clause, wherein the particular formation density is used to compensate the calculated formation density to obtain a compensated formation density.

The downhole tool of any preceding clause, wherein the one or more neutron detectors include a first neutron detector and a second neutron detector located at different locations from the one or more gamma ray detectors relative to the neutron generator.

The downhole tool of any preceding clause, wherein a first measurement of the first gamma ray detector and a second measurement of the second gamma ray detector are used to obtain a ratio measurement, the ratio measurement is used with a first measurement of the first neutron detector to calculate a particular formation density, and the second measurement of the second gamma ray detector and a second measurement of the second neutron detector are used to obtain a second calculated formation density.

The downhole tool of any preceding clause, wherein the particular formation density is used to compensate the second calculated formation density to obtain a compensated formation density.

A method includes irradiating a geological formation, via a pulsed neutron generator, with neutrons. The method also includes detecting gamma rays from the formation by using one or more gamma ray detectors located at different locations relative to the neutron generator. The method also includes detecting neutrons from the formation by using one or more neutron detectors located at different locations relative to the neutron generator. The method also includes analyzing the detected gamma rays and the detected neutrons to determine a compensated formation density.

The method of any preceding clause, wherein analyzing the detected gamma rays and the detected neutrons to determine the compensated formation density includes measuring spectra of gamma rays detected by the one or more gamma ray detectors and identifying, based on the spectra of gamma rays, gamma rays generated via inelastic scattering of the neutrons from heavy elements of the geological formation and neutron capture processes in the geological formation from the detected gamma rays.

The method of any preceding clause, including: calculating a first calculated formation density and a second calculated formation density using the identified gamma rays from respective gamma ray detectors of the one or more gamma ray detectors and the detected neutrons from respective neutron detectors of the one or more neutron detectors; and obtaining the compensated formation density by using the first calculated formation density to compensate the second calculated formation density.

A system includes a downhole tool and data processing circuitry associated with the downhole tool. The downhole tool includes a neutron generator configured to emit neutrons into a geological formation. The downhole tool also includes a first neutron detector and a second neutron detector located at different locations relative to the neutron generator, and the first and second neutron detectors are configured to detect neutrons that return to the downhole tool after interacting with the geological formation. The downhole tool also includes one or more gamma ray detectors configured to detect gamma rays from the geological formation that form when neutrons are inelastically scattered by the geological formation. The data processing circuitry is configured to calculate a first calculated formation density by using a first measurement of the first neutron detector and a measurement of a gamma ray detector of the one or more gamma ray detectors. The data processing circuitry is also configured to calculate a second calculated formation density by using a second measurement of the second neutron detector and the measurement of the gamma ray detector. The data processing circuitry is also configured to obtain a compensated formation density by using the first calculated formation density to compensate the second calculated formation density The system of the preceding clause, wherein the neutron generator includes a pulsed neutron generator configured to generate pulses of energetic neutrons.

The system of any preceding clause, wherein the one or more gamma ray detectors include a first gamma ray detector and a second gamma ray detector located at different locations relative to the neutron generator, wherein a first measurement of the first gamma ray detector and a second measurement of the second gamma ray detector are used to obtain a ratio measurement, the ratio measurement is used with a first measurement of the first neutron detector to calculate a particular formation density, and the second measurement of the second gamma ray detector and the first measurement of the first neutron detector are used to obtain a first calculated formation density, and the particular formation density is used to compensate the first calculated formation density to obtain a compensated formation density.

The system of any preceding clause, wherein the one or more gamma ray detectors include a first gamma ray detector and a second gamma ray detector located at different locations relative to the neutron generator, wherein a first measurement of the first gamma ray detector and a second measurement of the second gamma ray detector are used to obtain a ratio measurement, the ratio measurement is used with a first measurement of the first neutron detector to calculate a particular formation density, and the second measurement of the second gamma ray detector and a second measurement of the second neutron detector are used to obtain a second calculated formation density, and the particular formation density is used to compensate the second calculated formation density to obtain a compensated formation density.

The downhole tool of any preceding clause, wherein the sorbent-based gas capture unit is configured to route the heated fluid through or around the sorbent-containing conduits via one or more heat exchange conduits without contacting the sorbent material in an indirect heat transfer manner.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

In the claims, means-plus-function clauses are intended to cover the structures described herein as performing the recited function and not only structural equivalents, but also equivalent structures. Thus, for example, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A downhole tool comprising:

a neutron generator configured to emit neutrons into a geological formation;

one or more neutron detectors configured to detect neutrons that return to the downhole tool after interacting with the geological formation; and one or more gamma ray detectors configured to detect gamma rays from the geological formation that form when neutrons are inelastically scattered by the geological formation, wherein measurements from a combination of detectors of at least one of the one or more neutron detectors and at least one of the one or more gamma ray detectors are used to determine formation density, and wherein a first formation density determined using a first combination of detectors is used to compensate a second formation density determined using a second combination of detectors.

2. The downhole tool of claim 1, wherein the neutron generator comprises a pulsed neutron generator configured to generate pulses of energetic neutrons.

3. The downhole tool of claim 1, wherein the one or more neutron detectors comprise a first neutron detector and a second neutron detector located at different locations relative to the neutron generator.

4. The downhole tool of claim 3, wherein the one or more gamma ray detectors comprise a gamma ray detector located at a different location from the one or more neutron detectors relative to the neutron generator.

5. The downhole tool of claim 4, wherein a first measurement of the first neutron detector and a measurement of the gamma ray detector are used to obtain a first calculated formation density, and a second measurement of the second neutron detector and the measurement of the gamma ray detector are used to obtain a second calculated formation density.

6. The downhole tool of claim 5, wherein the first calculated formation density is used to compensate the second calculated formation density to obtain a compensated formation density.

7. The downhole tool of claim 1, wherein the one or more gamma ray detectors comprise a first gamma ray detector and a second gamma ray detector located at different locations relative to the neutron generator.

8. The downhole tool of claim 7, wherein the one or more neutron detectors comprise a neutron detector located at a different location relative to the neutron generator than the one or more gamma ray detectors.

9. The downhole tool of claim 8, wherein a first measurement of the first gamma ray detector and a second measurement of the second gamma ray detector are used to obtain a ratio measurement, the ratio measurement is used with a measurement of the neutron detector to calculate a particular formation density, and the second measurement of the second gamma ray detector and the measurement of the neutron detector are used to obtain a calculated formation density.

10. The downhole tool of claim 9, wherein the particular formation density is used to compensate the calculated formation density to obtain a compensated formation density.

11. The downhole tool of claim 7, wherein the one or more neutron detectors comprise a first neutron detector and a second neutron detector located at different locations from the one or more gamma ray detectors relative to the neutron generator.

12. The downhole tool of claim 11, wherein a first measurement of the first gamma ray detector and a second measurement of the second gamma ray detector are used to obtain a ratio measurement, the ratio measurement is used with a first measurement of the first neutron detector to calculate a particular formation density, and the second measurement of the second gamma ray detector and a second measurement of the second neutron detector are used to obtain a second calculated formation density.

13. The downhole tool of claim 12, wherein the particular formation density is used to compensate the second calculated formation density to obtain a compensated formation density.

14. A method comprising:

irradiating a geological formation, via a pulsed neutron generator, with neutrons;

detecting gamma rays from the geological formation by using one or more gamma ray detectors located at different locations relative to the pulsed neutron generator;

detecting neutrons from the geological formation by using one or more neutron detectors located at different locations relative to the pulsed neutron generator; and analyzing the detected gamma rays and the detected neutrons to determine a compensated formation density, wherein analyzing the detected gamma rays and the detected neutrons to determine the compensated formation density comprises:

measuring spectra of gamma rays detected by the one or more gamma ray detectors; and identifying, based on the spectra of gamma rays, gamma rays generated via inelastic scattering of the neutrons from heavy elements of the geological formation and neutron capture processes in the geological formation from the detected gamma rays;

calculating a first calculated formation density and a second calculated formation density using the identified gamma rays from respective gamma ray detectors of the one or more gamma ray detectors and the detected neutrons from respective neutron detectors of the one or more neutron detectors; and obtaining the compensated formation density by using the first calculated formation density to compensate the second calculated formation density.

15. A system comprising:

a downhole tool comprising:

a neutron generator configured to emit neutrons into a geological formation;

a first neutron detector and a second neutron detector located at different locations relative to the neutron generator, wherein the first and second neutron detectors are configured to detect neutrons that return to the downhole tool after interacting with the geological formation; and one or more gamma ray detectors configured to detect gamma rays from the geological formation that form when neutrons are inelastically scattered by the geological formation; and data processing circuitry associated with the downhole tool, wherein the data processing circuitry is configured to:

calculate a first calculated formation density by using a first measurement of the first neutron detector and a measurement of a gamma ray detector of the one or more gamma ray detectors;

calculate a second calculated formation density by using a second measurement of the second neutron detector and the measurement of the gamma ray detector; and obtain a compensated formation density by using the first calculated formation density to compensate the second calculated formation density.

16. The system of claim 15, wherein the neutron generator comprises a pulsed neutron generator configured to generate pulses of energetic neutrons.

17. The system of claim 15, wherein the one or more gamma ray detectors comprise a first gamma ray detector and a second gamma ray detector located at different locations relative to the neutron generator, wherein a first measurement of the first gamma ray detector and a second measurement of the second gamma ray detector are used to obtain a ratio measurement, the ratio measurement is used with a first measurement of the first neutron detector to calculate a particular formation density, and the second measurement of the second gamma ray detector and the first measurement of the first neutron detector are used to obtain a first calculated formation density, and the particular formation density is used to compensate the first calculated formation density to obtain a compensated formation density.

18. The system of claim 15, wherein the one or more gamma ray detectors comprise a first gamma ray detector and a second gamma ray detector located at different locations relative to the neutron generator, wherein a first measurement of the first gamma ray detector and a second measurement of the second gamma ray detector are used to obtain a ratio measurement, the ratio measurement is used with a first measurement of the first neutron detector to calculate a particular formation density, and the second measurement of the second gamma ray detector and a second measurement of the second neutron detector are used to obtain a second calculated formation density, and the particular formation density is used to compensate the second calculated formation density to obtain a compensated formation density.

* * * * *